No. 613,937. Patented Nov. 8, 1898.
W. H. PECK & D. R. W. PATTERSON.
POWDERED COAL FURNACE.
(Application filed Sept. 24, 1897.)
(No Model.) 2 Sheets—Sheet 1.
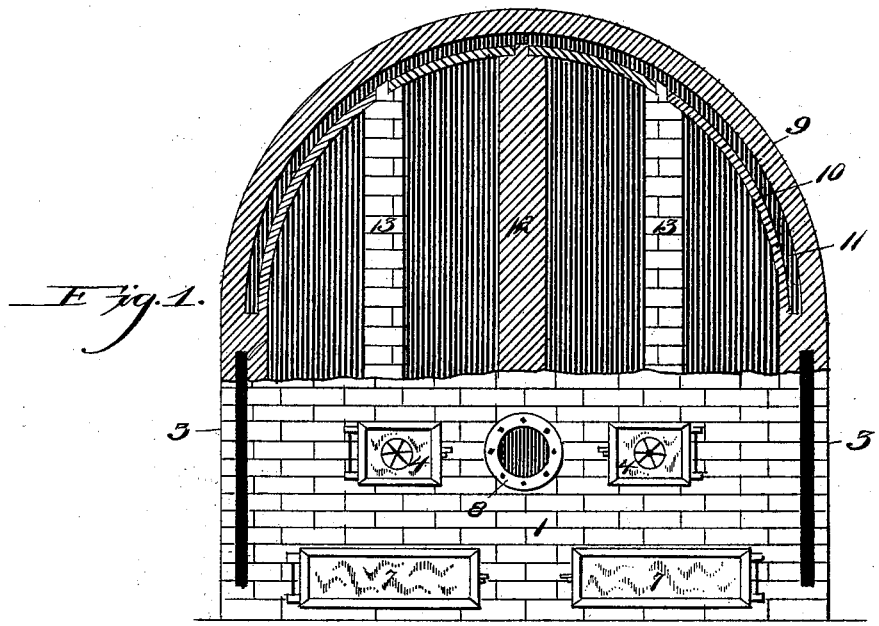
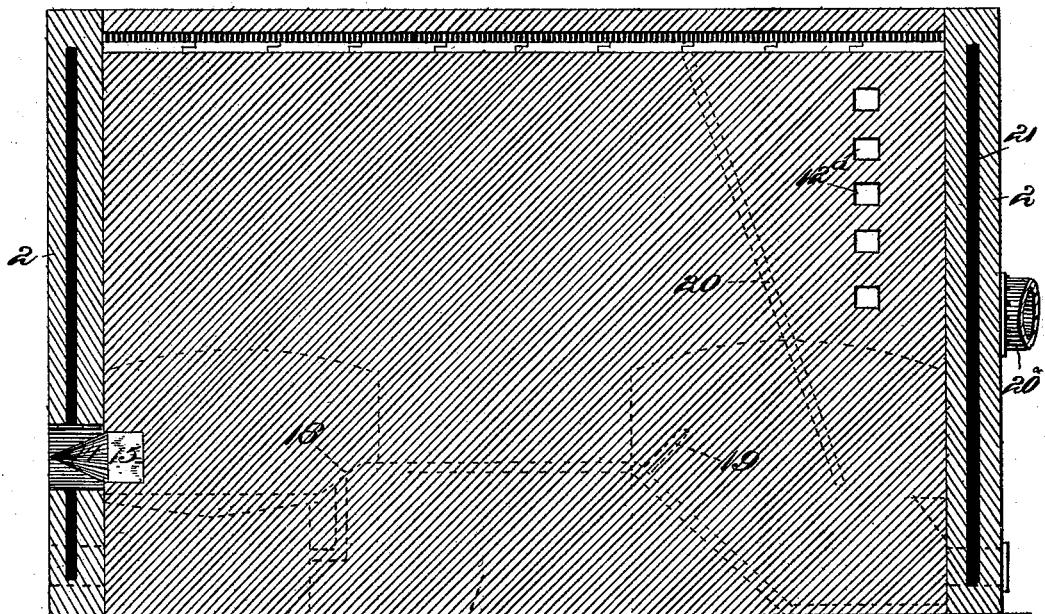

No. 613,937. Patented Nov. 8, 1898.
W. H. PECK & D. R. W. PATTERSON.
POWDERED COAL FURNACE.
(Application filed Sept. 24, 1897.)
(No Model.) 2 Sheets—Sheet 2.
Fig. 3.
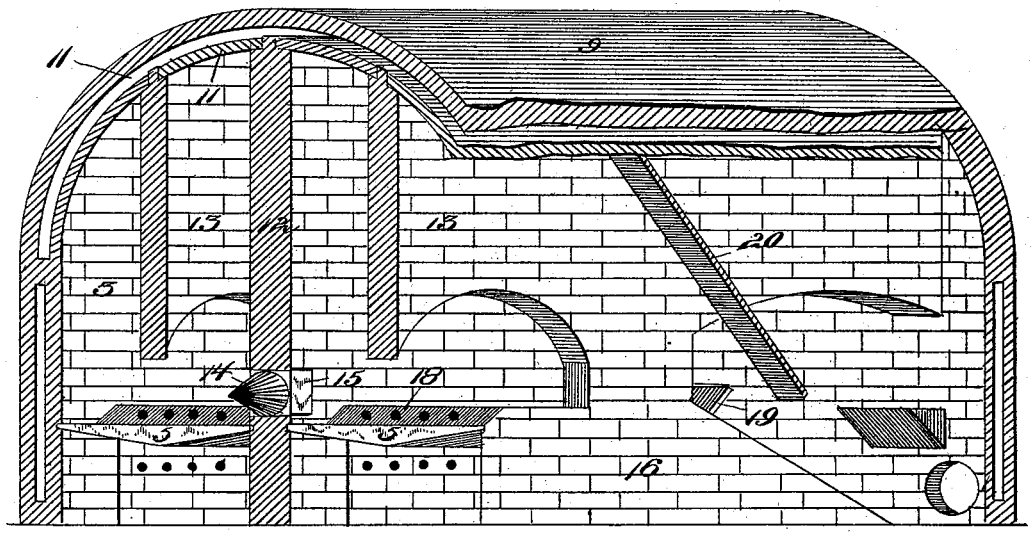
Fig. 5.
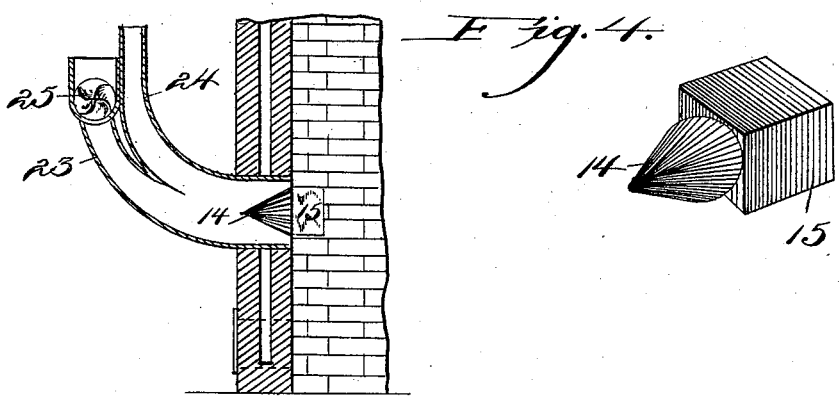
Fig. 4.
Witnesses
J. P. Appleman
W. H. Timmermann
Inventors
W. H. Peck
D. R. W. Patterson
By Henry C. Evert Attorney

UNITED STATES PATENT OFFICE.

WILLIAM H. PECK AND DAVID R. W. PATTERSON, OF PITTSBURG, PENNSYLVANIA.

POWDERED-COAL FURNACE.

SPECIFICATION forming part of Letters Patent No. 613,937, dated November 8, 1898.

Application filed September 24, 1897. Serial No. 652,838. (No model.)

*To all whom it may concern:*

Be it known that we, WILLIAM H. PECK and DAVID R. W. PATTERSON, citizens of the United States of America, residing at Pittsburg, in the county of Allegheny and State of Pennsylvania, have invented certain new and useful Improvements in Powdered-Coal Furnaces, of which the following is a specification, reference being had therein to the accompanying drawings.

This invention relates to certain new and useful improvements in furnaces, and relates particularly to that class of furnaces employing pulverized or powdered coal as a fuel, and has for its object to construct a furnace in which culm or refuse, as well as lump or slack coal, after being reduced to a pulverized condition, is fed into the furnace, together with a sufficient quantity of oxygen to produce perfect combustion.

The invention further aims to construct a furnace that will use the elements of carbon, hydrogen, and oxygen in the proper proportions that the highest efficiency may be obtained from the same.

Heretofore in furnaces employing pulverized coal as a fuel it has been impossible to raise the temperature of the furnace to such a degree that the products of combustion may be fully utilized before they escape from the exit-flue. To attain this result is the principal object of our invention, and we aim to accomplish this by providing the furnace with an outer casing composed of brick or other suitable material and an inner casing or sheathing of the same general shape as the outer casing and so arranged as to form an air-space between the two casings, the specific object and purpose of which will be hereinafter more specifically explained. To assist in attaining this result, we provide intermediate walls, which support the inner casing or sheathing and are arranged in the furnace in a manner to form throats, which serve to retain the high temperature of the furnace. We also employ in connection with our improved furnace novel means for evenly distributing the pulverized coal when introducing the same into the furnace and mixing it with the oxygen to attain the perfect combustion desired.

The furnace is particularly adapted for reheating and puddling purposes, although the use of the same is by no means limited to this specific purpose, as it may readily be adapted for such furnaces as are employed in potteries, for brick and lime kilns, for glass-houses, garbage-furnaces, or in any connection where it is desired to generate and retain an intense degree of heat.

For the purpose of illustration reference will be had to the accompanying drawings, forming a part of this specification, and wherein like figures of reference will indicate similar parts throughout the several views, in which—

Figure 1 is an end elevation of our improved furnace, partly in section to show the arrangement. Fig. 2 is a longitudinal sectional view of our improved furnace. Fig. 3 is a perspective view, partly broken away to show the interior of the furnace. Fig. 4 is a perspective view of the distributer or spreader. Fig. 5 is a sectional view of the fuel-pipe and a portion of the furnace.

Referring now to the drawings by reference-figures, 1 designates the front wall of the furnace, which is or may be composed of brickwork or other suitable material and is provided with suitable openings that are closed by doors 4 in the ordinary manner, said openings being provided for the purpose of securing ready access to the grate-bars 5. Underneath the grate-bars is provided the ash-pit, to which access is had through the openings provided therefor in the front wall, and which are closed by suitable doors 7. The rear wall 2 is or may be likewise composed of brickwork or other suitable material, together with the two side walls 3. These side walls 3 are adapted to receive and support an outer casing 9, which may likewise be of brickwork or other desirable material and in the drawings is shown as semicircular in form. It will of course be understood, however, that this specific form for the casing is not absolutely necessary, as the same may be of various other desired shapes and forms, as may be desired, according to the location in which the furnace is to be placed. This outer casing 9 is protected from the intense heat generated within the furnace by means of the inner casing or sheathing, which conforms to the general shape of the outer casing and is arranged a short distance therefrom, so as to form between the two casings an air-space 11. This inner casing or sheathing is supported by means of a central wall 12 and by means of two intermediate or supplemental walls 13, one on either side of the central wall, and each of said three walls being composed of brickwork or other suitable material. The two intermediate or supplemental walls are provided with cut-away portions 13ª at their base in order that the same may not interfere in any manner with the combustion-chambers of the furnace. The central wall 12 is or may be extended the entire length of the furnace and may also be provided near its rear end with openings 12ª, which permit the circulation of the heat from one compartment to another and thereby equalize the same.

For the purpose of evenly distributing or spreading the coal when it enters the combustion-chamber, so that the same may become thoroughly commingled with the oxygen, we provide a spreader or distributer, which is or may be of cone shape, as shown at 14, and which is located directly in front of the central wall 12, where it is retained by embedding a block 15 in the said wall. It will of course be understood that this spreader or distributer may be of various other shapes than the cone, as shown, this being shown principally to illustrate the objects of the said spreader or distributer, and we will therefore use this design in describing the same. The said spreader or distributer projects inwardly into an opening 8 provided therefor in the front wall of the furnace, said opening receiving the discharge end of the feed or supply pipe, which is formed with the two branches 23 24, the former of which communicates with the trough or other receptacle in which is located the screw 25 for conveying the powdered coal to the various branches 23. The branch 24 communicates with the feed-pipe and admits the oxygen to the powdered coal previous to its time of introduction into the combustion-chamber.

For the purpose of deflecting the gas that is generated within the combustion-chamber upwardly against the top of the furnace we provide a support 16, which supports the grate-bars and is provided with an inclined face 18, projecting upwardly toward the rear of the furnace, so that the gas is thereby impelled in the same direction.

Located within the throats which are formd throughout the furnace by means of the intermediate or supplemental walls we have arranged deflectors 20, which have their deflecting-surfaces arranged at an angle to that of the deflectors 18 and to that of the deflector 19, which is also supported by the support 16 at its rear end. These deflectors 20 extend below the deflectors 18 and 19, so that the gas may be carried thereby downwardly into the pit 19ª formed at the rear of the furnace, and within which is also arranged a deflector 20ª, the deflecting-face of which is at the same angle as that of the deflector 20. Access is had to this pit at the rear of the furnace by means of the opening 26. Exit may be made through the rear wall for communication with the exit-flue, as shown by the port at 20ª. The side and two end walls of the furnace are also provided with an air-space 21, which serves to protect the outside casing of the furnace against the intense heat within the same, and the air-space in the front wall 1, communicating with the opening 8, serves to admit the heated air into contact with the powdered coal and thereby raise the temperature of the same previous to the time that it reaches the point of ignition. As the coal is reduced to a powdered state and fed in through the supply-pipe the same is evenly distributed throughout the combustion-chamber by its coming into contact with the distributer, which spreads the same, and by reason of the heated air which passes from the air-space between the walls having become mingled with the coal previous to its reaching the point where it is ignited the temperature of the same is thereby raised, which assists in the perfect combustion after the fuel reaches the combustion chamber or chambers. The fire being inclosed within the throats and these throats being covered by the fire-clay rings of sheathing the latter serve to catch and maintain a uniform heat throughout the length of the boiler, thereby raising the temperature of the furnace to the highest possible constant efficiency.

Having fully described our invention, what we claim as new, and desire to secure by Letters Patent, is—

1. A furnace of the class described, comprising an outer casing and an inner casing or sheathing, the latter supported by a central and by intermediate walls and a spreader or distributer located in front of the central wall and engaging in the feed or supply pipe for distributing fuel evenly over the combustion-chamber, substantially as shown and described.

2. In a furnace of the class described, the combination with the combustion-chamber of a feed-pipe for supplying fuel thereto, a spreader arranged at the outlet of said feed-pipe for evenly distributing fuel over the combustion-chamber, the outer and inner casing which are similar in form and so arranged as to form an air-space between the same, and the supporting-walls for the inner casing, substantially as shown and described.

3. In a furnace of the class described, the combination of an outer and an inner casing having an air-space between the same, the combustion-chamber and a spreader arranged in front of the combustion-chamber to evenly distribute the fuel over the said chamber, substantially as shown and described.

4. In a furnace of the class described, the combination of the outer semicircular casing, supporting-walls for same, an inner casing or sheathing similar in form to the outer casing and so arranged as to form an air-space between the same, supporting-walls for said inner casing and the deflectors arranged within the furnace between said supporting-walls, substantially as shown and described.

5. In a furnace of the class described, the combination of the combustion-chamber, the feed-pipe communicating therewith, the spreader arranged at the discharge of said feed-pipe for evenly distributing fuel over the entire surface of the combustion-chamber, the inner casing or sheathing and the central and intermediate supporting-walls for said casing or sheathing, substantially as shown and described.

6. In a furnace adapted for the use of powdered coal as a fuel, the combination of an outer and inner casing with an air-space formed between the same, the central and intermediate supporting-walls for the inner casing, said central wall being provided with openings, substantially as shown and described.

7. In a furnace of the class described, the combination of an outer and inner casing, having an air-space between the same, the supporting-walls which form throats within the furnace, and the deflectors arranged within said throats, substantially as shown and described.

8. In combination, the combustion-chamber, the feed-pipe for same, the spreader for distributing fuel evenly over the entire area of the combustion-chamber, the outer and inner casings, the supporting-walls with an air-space formed between the same and the deflectors formed between the walls, substantially as shown and described.

9. In a furnace of the type described, the combination of an outer and an inner casing with an air-space formed between the same, the central and intermediate supporting-walls for the inner casing and the spreader arranged at the front of the central wall, substantially as shown and described.

10. In a furnace of the type described, the central and intermediate walls formed within the furnace, and a spreader secured in the central wall in front of the combustion-chamber, substantially as shown and described.

11. In a furnace of the type described, the combination with the central and intermediate supporting-walls, of the combustion-chamber supply-pipe having a substantially cone-shaped spreader arranged in the discharge end for distributing the fuel evenly over the combustion-chamber, substantially as shown and described.

12. In a furnace of the class described, the combination of the central and intermediate walls forming throats within the furnace, and the deflectors arranged in said throats, substantially as shown and described.

13. In a furnace of the type described, the combination of the outer and inner casing with an air-space between the same, a combustion-chamber, a gas-deflector arranged therein and a spreader arranged in front of the combustion-chamber, substantially as shown and described.

14. In a furnace of the type described, the combination of the outer and inner casings with an air-space formed between the same, a combustion-chamber, a spreader arranged in front of the combustion-chamber, and a gas-deflector arranged at an angle in the combustion-chamber, to deflect the gas upwardly and rearwardly, substantially as shown and described.

15. In a furnace of the type described, the combination of the central and intermediate walls forming throats, deflectors 20 arranged at an angle in said throats, and deflectors 19 also arranged in said throats at a reverse angle to the deflectors 20, substantially as shown and described.

16. In a furnace of the class described, the combination of the inner casing, the central and intermediate walls forming throats, the deflectors 19 and 20 arranged in said throats at reverse angles to each other, the pit formed in the furnace and into which the deflectors 20 project, the combustion-chamber, the deflectors 18 therein, and the spreader arranged in front of the combustion-chamber to distribute the fuel therein, substantially as shown and described.

17. In a furnace of the class described, the combination of the outer and inner casings having an air-space between the same, a combustion-chamber, a spreader located in front of said chamber, and means for supporting the inner casing, substantially as shown and described.

18. In a furnace of the type described, the combination of the outer and inner casing with an air-space formed between the same, a combustion-chamber, means whereby the heated air within the air-space between the two casings is admitted into contact with the powdered coal in the combustion-chamber to increase the temperature of the same previous to ignition, and a spreader or distributer arranged in front of the combustion-chamber for evenly distributing the fuel within the same, substantially as shown and described.

19. In a furnace adapted for the use of powdered coal as a fuel, the combination with the outer and inner casing having an air-space between the same, a combustion-chamber, a supply-pipe for said chamber, a spreader arranged in the discharge end of said supply-pipe and in front of the combustion-chamber, and feeding means for delivering the powdered coal to the supply-pipe, substantially as shown and described.

20. In a furnace adapted for the use of powdered coal as a fuel, the combination of the outer and inner casing, a combustion-chamber, a supply-pipe, a feeding means for the supply, a branch connecting with the supply-pipe to furnish oxygen to the coal previous to its entering the combustion-chamber, and a spreader arranged in front of the combustion-chamber for evenly distributing the fuel within said chamber, substantially as shown and described.

In testimony whereof we affix our signatures in presence of two witnesses.

WILLIAM H. PECK.
DAVID R. W. PATTERSON.

Witnesses:
H. C. EVERT,
GEO. B. PARKER.